United States Patent [19]

Duffus

[11] Patent Number: 4,786,175
[45] Date of Patent: Nov. 22, 1988

[54] ROTATABLE SHEAR PLATE INTERFEROMETER

[75] Inventor: Richard C. Duffus, Livermore, Calif.

[73] Assignee: The United States of America as represented by the United States Department of Energy, Washington, D.C.

[21] Appl. No.: 911,605

[22] Filed: Sep. 26, 1986

[51] Int. Cl.$^4$ .............................................. G01B 9/02
[52] U.S. Cl. .................................... 356/353; 356/363
[58] Field of Search ............... 356/353, 363, 138, 153; 350/486

[56] References Cited

U.S. PATENT DOCUMENTS 3,345,912 10/1967 Lohmann ............................. 356/353
3,912,394 10/1975 Kelsall ................................ 356/353

FOREIGN PATENT DOCUMENTS 0638040 8/1983 Switzerland ......................... 356/353

OTHER PUBLICATIONS

Murty et al, "Rotational-Shearing Interferometry", Applied Optics, vol. 5, No. 4, Apr. 1966, pp. 615-618.
Greenaway et al, "A 180° Rotation Shearing . . . Efficiency", Optics Communications, vol. 32, No. 1, Jan. 1980, pp. 48-50.
Harrison, "Cosine Error-Detection Apparatus", IBM Tech. Disclosure Bulletin, vol. 15, No. 3, Oct. 1972, pp. 1477-1478.

Primary Examiner—Eugene R. LaRoche
Assistant Examiner—Seung Ham
Attorney, Agent, or Firm—P. Martin Simpson, Jr; L. E. Carnahan; Judson R. Hightower

[57] ABSTRACT

A rotatable shear plate interferometer comprises a transparent shear plate mounted obliquely in a tubular supporting member at 45° with respect to its horizontal center axis. This tubular supporting member is supported rotatably around its center axis and a collimated laser beam is made incident on the shear plate along this center axis such that defocus in different directions can be easily measured.

7 Claims, 1 Drawing Sheet

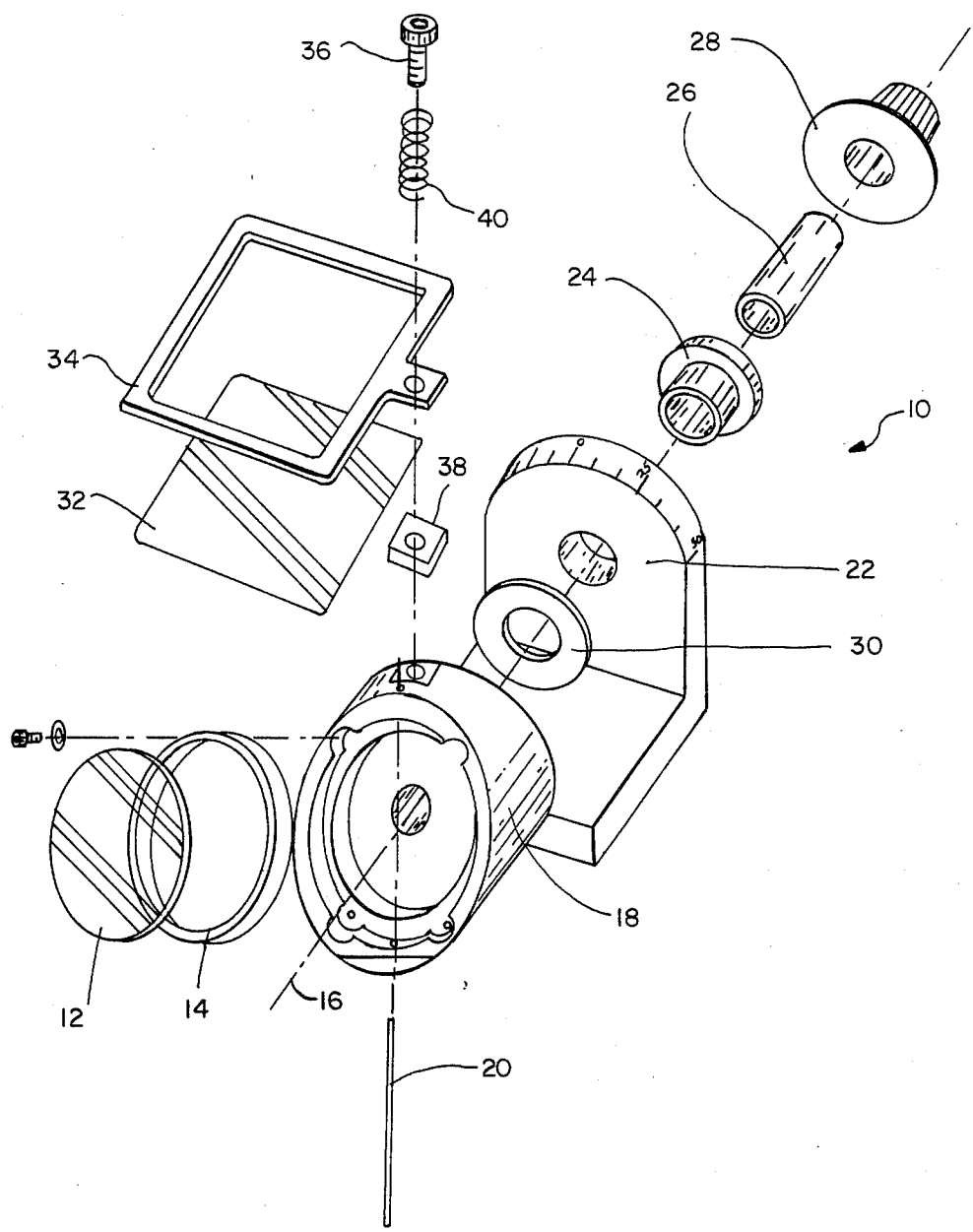

ROTATABLE SHEAR PLATE INTERFEROMETER

The United States Government has rights in this invention pursuant to Contract No. W-7405-ENG-48 between the U.S. Department of Energy and the University of California for operation under Lawrence Livermore National Laboratory.

FIELD OF THE INVENTION

This invention relates to a shear plate interferometer for measuring aberrations in a laser beam and more particularly to a rotatable shear plate interferometer which simplifies the measurement of laser beam aberrations varying in more than one direction.

BACKGROUND OF THE INVENTION

The shear plate interferometer provides a fast and simple manual means of measuring defocus, astigmatism and coma in a laser beam. A normal, commercially available shear plate interferometer typically comprises a glass shear plate which has a slight vertical wedge in it and is mounted in an L-shaped bracket so as to be maintained in a vertical position. When a horizontal laser beam is made obliquely incident on this shear plate, a finite derivative of its wavefront is taken in the direction of shear and the reflected beams from its front and back surfaces interfere with each other in a well known manner to produce horizontal fringes. The distance between adjacent fringes depends on the wedge angle. A horizontally sheared interferogram thus obtained measures the laser beam aberrations which vary in the horizontal plane but does not record aberration components which vary only in the vertical direction. Thus, it may be possible to balance astigmatism against defocus in the horizontal plane but there may be left a vertically varying cylindrical wavefront error.

SUMMARY OF THE INVENTION

It is an object of the present invention to provide a shear plate interferometer with which defocus, astigmatism and coma in a laser beam can be measured in any direction.

It is another object of the present invention to provide a shear plate interferometer with a shear plate rotatably mounted.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the rotatable shear plate interferometer of this invention may comprise a tubular member supported by a bracket-like stand so as to be rotatable around a horizontal axis and a wedged glass plate for producing an interference pattern obliquely mounted in this tubular member at 45° with respect to the axis of rotation.

BRIEF DESCRIPTION OF THE DRAWING

The accompanying drawing, which is incorporated in and forms a part of the specification, is an exploded view of a rotatable shear plate interferometer embodying the present invention and, together with the following detailed description, serves to explain the principles of the invention.

DETAILED DESCRIPTION OF THE INVENTION

With reference to the Figure which is an exploded view of a rotatable shear plate interferometer 10 embodying the present invention, a transparent shear plate 12 which includes a slight wedge is held by a retaining ring 14 at an angle of 45° with respect to the central axis 16 of a tubular supporting member 18. A reference wire 20 is affixed to the tubular supporting member 18 so as to be parallel to the surface of the shear plate 12 and across the central axis 16. The tubular supporting member 18 is rotatably supported in a horizontal position by a generally L-shaped stand 22 with a horizontal base and a vertical wall having a circular opening therethrough. A bearing 24 is provided at this opening such that a hollow shaft 26 affixed at one end to the tubular supporting member 18 and at the other end to a hollow control knob 28 is freely rotatable around the horizontal central axis 16 through the opening by turning the knob 28. A washer 30 is further provided between the tubular supporting member 18 and the vertical wall of the stand 22. A translucent screen 32 is supported by a frame 34 which is rotatably affixed to the tubular supporting member 18 by means of a screw 36, a detent washer 38 and a spring 40.

The interferometer 10 thus structured is placed with respect to a collimated laser beam of interest such that the beam will be incident on the wedged glass plate 12 along the axis of rotation 16 of the tubular supporting member 18. The desired alignment is achieved by examining if a portion of the beam can travel through the hollow shaft 26 and the knob 28 concentrically with the axis 16 to form a circular spot. If the tubular supporting member 18 is rotated around the axis 16 with the beam thus aligned, the angle of incidence on the shear plate 12 remains 45°, independent of the angular orientation of the shear plate 12. This provides an easy method of changing the shear direction so that defocus in different directions can be conveniently measured. The reference wire 20, mounted as explained above, is in the direction of shear and the wedge plate 12 is rotated around its normal until the fringes are parallel to the wire 20. The viewing screen is so attached to the tubular supporting member 18 that it can be moved to intercept the beam reflected from the shear plate 12. This makes the viewing of fringes easier.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a standard 5 cm glass shear plate of 1 cm in thickness may be used such that a one-fringe tilt results from a wavefront radius of 300 meters in the direction of shear but this is not intended to limit the scope of the present invention. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A rotatable shear plate interferometer comprising a tubular member which defines a central axis and is rotatably supported by a bracket means around said central axis, a transparent shear plate obliquely mounted in said tubular member at a fixed angle with respect to said axis, and a viewing screen rotatably attached to said tubular member so as to be able to assume a viewing position such that an interference pattern of a light beam made incident on said shear plate along said central axis can be observed on said viewing screen placed in said viewing position at any angular position of said tubular member around said central axis, whereby defocus, astigmatism and coma in said incident light beam can be measured in any direction.

2. The interferometer of claim 1 wherein said fixed angle is 45°.

3. The interferometer of claim 1 wherein said central axis is maintained horizontally.

4. The interferometer of claim 1 wherein said shear plate is made of glass.

5. The interferometer of claim 1 further comprising a wire affixed to said tubular member and parallel to said shear plate.

6. The interferometer of claim 1 further comprising a hollow shaft supported coaxially with said central axis by said bracket means.

7. The interferometer of claim 1 wherein said bracket means is generally L-shaped with a vertical member having a horizontal opening coaxial with said central axis and a horizontal member serving as a base for supporting interferometer.

* * * * *